No. 839,629. PATENTED DEC. 25, 1906.
H. W. O'DOWD.
WATER HEATER.
APPLICATION FILED AUG. 18, 1905.
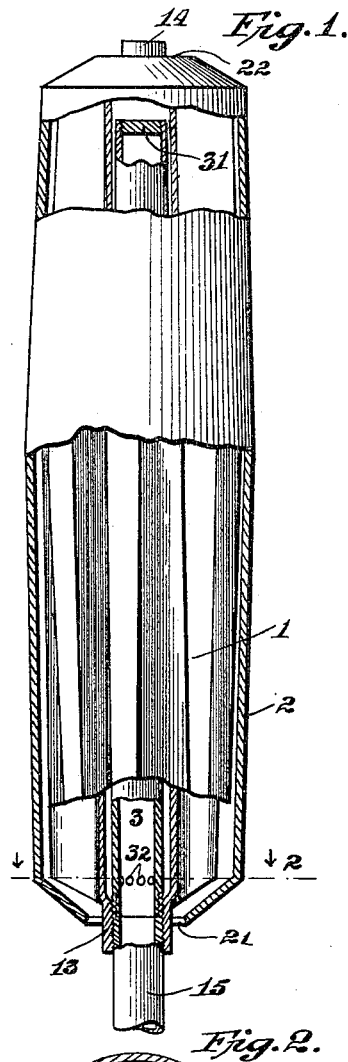
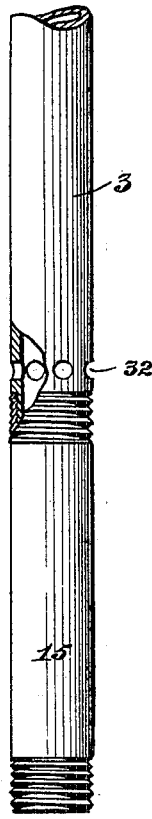
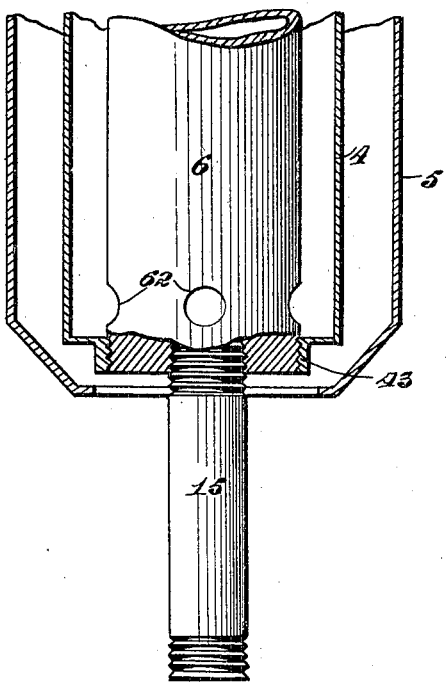
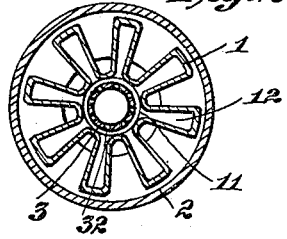
Attest:
Henry W. O'Dowd Inventor:
by Dickerson, Brown, Raegner & Binney
Attys

UNITED STATES PATENT OFFICE.

HENRY W. O'DOWD, OF PEEKSKILL, NEW YORK.

WATER-HEATER.

No. 839,629.   Specification of Letters Patent.   Patented Dec. 25, 1906.

Application filed August 18, 1905. Serial No. 274,688.

*To all whom it may concern:*

Be it known that I, HENRY W. O'DOWD, a citizen of the United States, and a resident of Peekskill, in the county of Westchester and State of New York, have invented certain new and useful Improvements in Water-Heaters, of which the following is a specification.

My invention relates to water-heaters, and particularly to those used for domestic purposes for heating a supply of water by means of gas.

In the drawings, Figure 1 is an elevation, partly broken away, of a water-heater embodying my invention. Fig. 2 is a transverse section through the line 2 2, Fig. 1. Fig. 3 represents a part of the device shown in Fig. 1 detached from the rest. Fig. 4 is a partial vertical section of a modified form of my device.

Referring first to Figs. 1, 2, and 3 of the drawings, 1 designates a water-containing vessel, such as is shown in United States patent granted to me August 22, 1905, No. 797,744. It consists of a water-containing vessel 1, shown as comprising an approximately cylindric central chamber 11 and a plurality of radially-extending wings or antechambers 12, connected with and of substantially the same length as the chamber 11. At the ends of the vessel 1 are nipples 13 and 14, which may be interiorly threaded or otherwise adapted to be connected, respectively, to water admission and exhaust pipes. Surrounding the vessel 1 is a jacket 2, shown as cylindric in cross-section, but which, of course, may be of any desired form. At the upper and lower ends of the jacket 2 are apertures 21 22 for the admission and emission of the heating fluid, which may be the products of combustion from an annular gas-burner (not shown) surrounding the nipple 13. Screwed within the nipple 13 is a water-inlet pipe 15. Also secured within the upper end of the nipple 13 and shown as screwed within the upper end of the pipe 15 is a plug 3. As shown, this consists of a piece of pipe closed at its upper end by a stopper 31. The lower end of the plug 3 is pierced with a plurality of apertures 32, (shown as eight in number,) corresponding to and placed in line with the openings of the wing-chambers 12 in the vessel 1.

In the practical operation of the device shown in my patent above referred to I have found that under some circumstances the body of the water flows directly through the central chamber 11 of the vessel 1 and is therefore not sufficiently exposed to the heated gases in the jacket 2. By inserting in the central chamber a plug 3, which, as shown, extends for approximately the entire length of the chamber and is of an exterior diameter only slightly less than the diameter of such chamber, the water is forced through the apertures 32 directly into the wing-chambers 12, so that it is much more rapidly and efficiently heated.

While for economy of manufacture I have shown the plug 3 as a piece of pipe closed by a stopper 31 at its upper end, it is obvious that any form of plug may be employed by which the water is prevented from flowing through the central portion of the chamber except at the periphery thereof. It is also obvious that while I have spoken of the pipe 14 as the "outlet-pipe" for the water and the pipe 15 as the "inlet-pipe" the particular direction in which the water flows is immaterial to my invention. The apertures 32 in the plug 3 may be of any desired size, it being advantageous that their combined area should be capable of passing the water carried by the pipe 15.

In the form of the device shown in Fig. 4 the water-chamber 4 is of cylindric form and is as before surrounded by an outer jacket 5. In this case the central plug 6 is screwed directly into the nipple 43 of the vessel 4 and is centrally bored and tapped for the reception of the inlet-pipe 15. As before, the plug 6 is provided with a plurality of outlets 62 near its lower end. It is of course understood that the plug 6 is closed at its upper end by a stopper, as before described. While in this form of the device the particular advantages of the wing-chambers set forth in my patent above referred to are lost, it is still found that the annular space between the plug 6 and the wall of the vessel 4 forms an efficient heating means for the water passing through the vessel and that the water is more quickly heated than in a vessel of similar construction without the central plug.

In both forms of my device a lateral as well as a vertical circulation is afforded, which is advantageous if the heat is somewhat unequally applied throughout the area of the jacket 2 or 5.

It is obvious that mechanical changes other than those shown may be made in my device without departing from the spirit of my invention.

While I prefer to have the central plug extend approximately the entire length of the liquid-holding vessel, it is obvious that it would be of considerable effect if it were shortened to some extent.

What I claim is—

1. In a water-heater, a liquid-holding vessel, inlet and outlet connections for said vessel, and a plug secured to one of said connections and occupying the lower central portion of said vessel and extending upward for a substantial part of its length for preventing the passage of a liquid through such central portion, said plug having a lateral aperture in its wall near its lower end forming a passage from said connection to the outer portion of said vessel.

2. In a water-heater, a liquid-holding vessel, inlet and outlet connections for said vessel, and a plug secured to one of said connections and occupying the central portion of said vessel and extending upward approximately its entire length for preventing the passage of a liquid through such central portion, said plug having a lateral aperture in its wall near its lower end forming a passage from said connection to the outer portion of said vessel.

3. In a water-heater, a liquid-holding vessel, inlet and outlet connections for said vessel, a plug axially secured to one of said connections within said vessel extending approximately the length thereof and forming with the wall of said vessel a space for the liquid to be heated, and said plug having a lateral aperture in its wall forming a passage from said inlet connection to said annular space.

4. In a water-heater, a liquid-holding vessel, inlet and outlet connections for said vessel, a plug axially secured within said vessel extending approximately the length thereof and forming with the wall of said vessel a space for the liquid to be heated, said plug being connected to said inlet and having a lateral aperture in its lower end forming a passage from said inlet connection to said annular space.

5. In a water-heater, a liquid-holding vessel, comprising a central chamber and a plurality of radially-extending antechambers connected therewith, inlet and outlet connections for said vessel, and a plug axially secured within said central chamber and extending approximately its entire length, said plug having a lateral aperture near one of its ends and being closed at its other end to prevent the passage of liquid therethrough, whereby substantially the entire volume of liquid is circulated through said antechambers.

6. In a water-heater, a liquid-holding vessel comprising a central chamber and a plurality of radially-extending antechambers connected therewith, inlet and outlet connections for said vessel, and a plug axially secured within said central chamber and extending approximately its entire length, said plug being connected to said inlet and having a lateral aperture in its lower end forming a passage from said inlet connection to said antechambers whereby substantially the entire volume of liquid is circulated through said antechambers.

In testimony whereof I have signed this specification in the presence of two subscribing witnesses.

HENRY W. O'DOWD.

Witnesses:
GEO. H. SCUDDER,
R. L. BOGART.